W. E. TOOKEY.
WHEEL GUARD.
APPLICATION FILED MAY 2, 1917.

1,283,428.

Patented Oct. 29, 1918.

Inventor.
W. E. Tookey
by H. J. S. Dennison
Atty.

UNITED STATES PATENT OFFICE.

WILLIAM E. TOOKEY, OF FERGUS, ONTARIO, CANADA, ASSIGNOR OF ONE-HALF TO ABRAHAM GROVES, OF FERGUS, ONTARIO, CANADA.

WHEEL-GUARD.

1,283,428.

Specification of Letters Patent.

Patented Oct. 29, 1918.

Application filed May 2, 1917. Serial No. 165,936.

*To all whom it may concern:*

Be it known that I, WILLIAM E. TOOKEY, a subject of the King of Great Britain, and resident of the town of Fergus, county of Wellington, Province of Ontario, in the Dominion of Canada, have invented certain new and useful Improvements in Wheel-Guards, as described in the following specification and illustrated in the accompanying drawings, that form part of the same.

The principal objects of the invention are, to protect the public and particularly workmen operating around railway and tram cars from injury through being run over and having legs and arms cut off, crushed or maimed by the wheels of a car or other vehicle operating upon the rails.

A further and important object is to devise an effective means for turning aside any obstacle upon the rail in the path of the wheel and further, to provide a device which may be manufactured at very low cost and may be easily and quickly attached to the truck.

The principal feature of the invention consists in the novel construction and arrangement of parts whereby an individual guard member is supported in advance of the wheel and in proximity to the rail and is adapted to move into closer contact with the rail upon meeting an obstruction and turn same aside.

Figure 1:
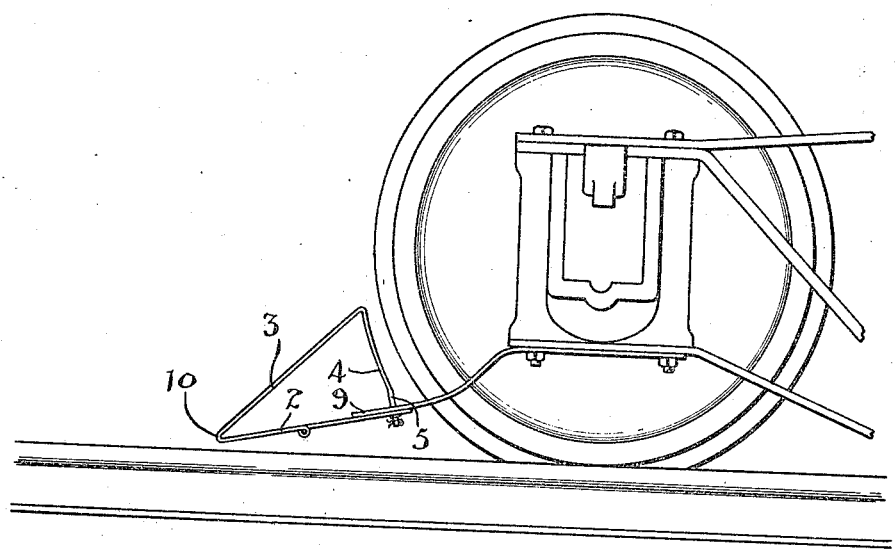

In the drawings Figure 1 is a side elevational view showing my device attached to a car truck.

Figure 2:
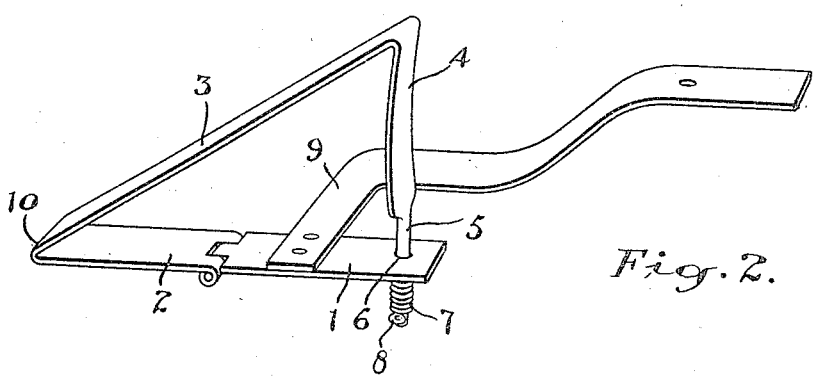

Fig. 2 is an enlarged perspective detail view of the device.

It is well known that a very large proportion of the injuries to railway employees are caused by the wheels of the vehicle passing over their bodies following a slip or fall in close proximity to the rail and the main feature of this invention is to provide a device which can be placed in front of each wheel which will effectively prevent the body or extremities being gripped in the shearing action of the wheel.

To accomplish this purpose I have devised a substantially triangular shaped member which is formed of the lower rear section 1 and a forward section 2 secured to the forward end of the section 1 in a hinged joint. This forward section is bent upwardly at an acute angle and extends rearwardly forming the sloping member 3. The upper end of the member 3 is turned downwardly forming the rear bar 4 and the lower end of this rear bar is preferably rounded to form a shank 5 which extends through a hole 6 in the rearmost end of the member 1.

A spiral spring 7 encircles the end of the shank 5 below the member 1 and is held in place by a suitable cotter 8.

The member 1 is fixedly secured to a rigid arm 9 which extends laterally therefrom and is bent rearwardly and upwardly to be secured at its opposite end to the underside of the frame of the car truck at a point as nearly adjacent to the forward side of the wheel as possible, so as to retain as much rigidity in the arm as may be possible.

The offset forward end of the arm 9 holds the triangular shaped guard member directly in front of the running flange of the wheel and close thereto with the lower portion close to the rail, thus forming a guard which will lift any object which it may come in contact with and have the tendency to throw it aside.

The guard member is hinged centrally in its bottom section and the upper portion is free to move upwardly at the rear end as the acute angled nose 10 swings downwardly into contact with an obstruction and the spring 7 allows this action to take place, but under ordinary conditions maintains the nose of the guard clear of the rail.

The device is made up of bar iron or steel and is very simple to construct and may be manufactured at very slight cost and when placed in position upon a car truck in advance of each wheel, it will be practically impossible for the body or members of the body of a person falling across the track to be run over by the wheel.

A further important element in the effectiveness of the guard is in its flexibility through the hinging of the forward member which is allowed to move downwardly upon contact with the obstruction.

What I claim as my invention is:—

1. In a wheel guard, the combination with the frame of the car, of a member rigidly supported from the frame, and extending in advance of the wheels, and a member hinged to said rigid member and extending forwardly and spring held close to the rail and having a rearwardly and upwardly sloping rigid guard extending close to the wheel.

2. In a wheel guard the combination with the frame of the car, of a guard member rigidly supported from the frame and extending in advance of the wheel, said guard member being of substantially triangular form having the lower side thereof extending substantially parallel with the rail and close thereto, and the base of the triangle extending close to the flange of the wheel, the lower side of said triangular member being formed with a flexible joint, and spring means for holding the forward end of the guard in a normally raised position clear of the rail.

3. In a wheel guard, the combination with the car frame, of an arm rigidly secured to said frame having an offset end extending in advance of the wheel, a member arranged upon the extension end of said arm above the rail and close to the wheel, a bar hinged to the forward end of said extension member and extending forwardly thereof and bent upwardly and rearwardly in a sloping direction and having its rear end returned downwardly and extending through the rear end of said extension member and a coil spring encircling the downwardly extending end projecting below the rigid member and holding the pivotal portion of the guard member in a raised position.

W. E. TOOKEY.

Copies of this patent may be obtained for five cents each, by addressing the "Commissioner of Patents, Washington, D. C."